Patented June 21, 1949

2,473,958

UNITED STATES PATENT OFFICE 2,473,958

BLACK GLASS AND METHOD OF MAKING

Norbert J. Kreidl, Rochester, N. Y., assignor to Monsanto Chemical Company, a corporation of Delaware No Drawing. Application April 5, 1943, Serial No. 481,881

8 Claims. (Cl. 106—52)

This invention relates to new glass compositions containing a colorant comprising iron phosphide. The present invention provides a jet black, glossy, opaque glass which is suitable for ornamental and architectural purposes and also for the production of artistic glass containers. The present glass is somewhat similar in appearance to black obsidian. At the present time the usual colorants for the production of black glass are mainly the metals cobalt, chromium and manganese. Of these metals, cobalt is known to produce a blue glass, chromium to produce a green glass and manganese a purple glass. Hence in order to obtain a black glass, it is necessary to use substantial quantities of these metals which are expensive. At least several per cent of such metals are necessary and in many cases as much as 10% is required. I have found that only relatively small amounts of iron phosphide properly dispersed in the glass are satisfactory for the production of jet black glasses. In general as little as 0.1% to 0.05% or less of ferrophosphorus by weight in the glass is sufficient for the purpose. Under some conditions it may be necessary to supply 1% by weight of the batch as ferrophosphorus.

In an earlier patent granted to Berger (U. S. Patent 1,961,603) there is disclosed a heat absorbing glass which is produced by adding to the glass, phosphorus compounds of low oxidation, for instance compounds ranging from calcium hypophosphite, $Ca(H_2PO_2)_2$ to phosphides, for instance iron phosphide, $Fe_3P$. Such glasses are essentially transparent glasses, which when having a thickness of two millimeters, are practically colorless to the eye. In such glasses, the phosphide of iron acts strictly as a reducing agent, the absorption of ultra-red radiation taking place because of the presence in the glass of an appreciable amount of FeO. Such glasses, being transparent, do not contain colloidally dispersed iron phosphide.

My present glasses, on the other hand, are formed so as to contain crystals of iron phosphide, $Fe_3P$, of colloidal size, which crystals are formed by "striking." The phenomenon of "striking" is caused first by the formation of a supersaturated solution of iron phosphide in the molten glass followed by the formation of the colloidally dispersed crystals of iron phosphide upon cooling of the glass. A piece of two millimeters thickness is black and opaque.

For the purpose of producing my improved glass any glass forming materials may be employed, including for example cullet of any origin may be utilized. Accidentally occurring colorants in such cullet are not detrimental. For the production of my improved black glass I prefer to combine in a glass tank or pot the usual amount of cullet together with the glass forming oxides and salts such as silica, soda ash, limestone and dolomite. It is essential that the batch be kept free of oxidizing materials such as sodium sulfate and nitrates such as sodium nitrate. Ferrophosphorus is then added to the glass batch. The proportion of ferrophosphorus added should be that necessary for imparting a jet black color to the glass without having an appreciable excess of ferrophosphorus present. The amount used will depend somewhat upon the atmospheric conditions (oxidizing or reducing) present in the melting furnace. Usually in proportioning the batch the ferrophosphorus content may be restricted to 0.1% by weight or less. The glass is now worked out of the tank or pot in the ordinary way and formed into sheets or into bottles or containers of various kinds.

The ferrophosphorus employed is an alloy of iron and phosphorus, containing from 15% to 18% and up to 22% or 25% or more, of phosphorus, the balance being iron. Usually ferrophosphorus of commerce contains also some silicon, manganese and titanium. The amount of these elements may be from 0.1% to as much as 2% or 3% of silicon, 2% to 3% of manganese and up to 2% of titanium. These minor elements are unobjectionable for the present, and may even exert somewhat of an enhanced coloring and dispersing action upon the iron phosphide.

Commercial ferrophosphorus may be considered to consist of a mixture of the several known phosphides of iron, of which there are three, viz: FeP, $Fe_2P$ and $Fe_3P$. The compound FeP contains 35.8% of phosphorus, $Fe_2P$ contains 21.8% of phosphorus and $Fe_3P$ contains 15.7% of phosphorus. By combining various phosphides of iron, intermediate values of phosphorus content may be obtained.

Commercial ferrophosphorus is sold in pig or in lump form. In order to hasten solution of the ferrophosphorus in the glass it is preferred to utilize only the finely divided or powdered ferrophosphorus.

A fine state of subdivision is essential not only from the point of view of solution speed but of homogeneous distribution in the batch.

Due to the insolubility of the ferrophosphorus in the solidifying glass the tendency of the glass to strike is very pronounced and during ordinary working, therefore, the glass rapidly develops the desired black color.

The herein described glass contains crystals of colloidal size dispersed throughout the glassy matrix.

What I claim is:

1. A glass containing about 0.05% to about 1% by weight of colloidally dispersed iron phosphides which impart a black color thereto, said phosphides of iron containing between 15% and 25% of phosphorus.

2. A glass containing from about 0.05% to about 0.1% by weight of colloidally dispersed iron phosphide which imparts a black color thereto.

3. A glass containing from about 0.05% to about 1.0% by weight of colloidally dispersed iron phosphide which imparts a black color thereto.

4. A glass containing about 0.05% to about 1% by weight of a colloidally dispersed mixture of FeP, $Fe_2P$ and $Fe_3P$ which imparts a black color thereto.

5. The process which comprises preparing a glass batch containing about 0.05% to about 1% by weight of finely divided iron phosphide uniformly distributed therein, melting said batch under reducing conditions, shaping said molten batch to the desired form and then cooling the resulting glassy product to produce therein colloidally dispersed crystals of iron phosphide which impart a black color thereto.

6. The process which comprises melting under reducing conditions a glass batch containing from about 0.05% to about 1% by weight of ferrophosphorus uniformly distributed therein and then cooling the resulting glass to produce therein colloidally dispersed crystals of ferrophosphorus which impart a black color to said glass.

7. The process which comprises melting under reducing conditions a glass batch containing from about 0.05% to 0.1% by weight of ferrophosphorus uniformly distributed therein and then cooling the resulting glass to produce therein colloidally dispersed crystals of ferrophosphorus which impart a black color to said glass.

8. The process which comprises melting under reducing conditions a glass batch containing at least 0.1% by weight of ferrophosphorus uniformly distributed therein and then cooling the resulting glass to produce therein colloidally dispersed crystals of ferrophosphorus which impart a black color to said glass.

NORBERT J. KREIDL.

REFERENCES CITED

The following references are of record in the file of this patent:

UNITED STATES PATENTS

| Number | Name | Date |
|---|---|---|
| 1,961,603 | Berger | June 5, 1934 |
| 2,224,791 | Loffler | Dec. 10, 1940 |
| 2,314,804 | Willson | Mar. 23, 1943 |

OTHER REFERENCES

Journal American Ceramic Society, vol. 24, No. 10 (1941), page 339.